(12) United States Patent
Gunn

(10) Patent No.: US 7,806,308 B2
(45) Date of Patent: Oct. 5, 2010

(54) RELEASABLE MOUNTING OF BICYCLE RACK ON VEHICLE BUMPER

(75) Inventor: George W. Gunn, Livonia, MI (US)

(73) Assignee: Midwest Bus Corporation, Owosso, MI (US)

( * ) Notice: Subject to any disclaimer, the term of this patent is extended or adjusted under 35 U.S.C. 154(b) by 1054 days.

(21) Appl. No.: 11/521,047

(22) Filed: Sep. 14, 2006

(65) Prior Publication Data

US 2008/0067209 A1   Mar. 20, 2008

(51) Int. Cl.
  *B60R 9/06* (2006.01)
  *B60R 9/10* (2006.01)
(52) U.S. Cl. .............. 224/514; 224/512; 224/547; 224/924; 248/222.51; 248/223.31
(58) Field of Classification Search ........... 224/504, 224/505, 506, 507, 508, 511, 512, 514, 516, 224/555, 924, 547; 248/222.51, 223.31, 248/224.8, 220.22; 280/491.5, 460.1; 16/324, 16/349; 403/326, 353
See application file for complete search history.

(56) References Cited

U.S. PATENT DOCUMENTS

| | | | |
|---|---|---|---|
| 556,789 A | 3/1896 | Walker | |
| 576,351 A | 2/1897 | Penfield | |
| 607,024 A | 7/1898 | Durfee et al. | |
| 615,264 A | 12/1898 | Du Pont | |
| 1,522,339 A | 1/1925 | Specht | |
| 3,116,836 A | 1/1964 | McCauley | |
| 3,355,028 A | 11/1967 | Mork | |
| 3,367,548 A | 2/1968 | Cooper | |
| 3,510,146 A * | 5/1970 | Hartman | 280/491.5 |
| 3,529,737 A | 9/1970 | Daugherty | |
| 3,744,689 A | 7/1973 | Kjensmo | |
| 3,861,533 A | 1/1975 | Radek | |
| 3,921,842 A | 11/1975 | Campbell | |
| 4,125,214 A | 11/1978 | Penn | |
| 4,171,077 A | 10/1979 | Richard, Jr. | |
| 4,204,701 A * | 5/1980 | Oltrogge | 280/491.5 |
| 4,213,729 A | 7/1980 | Cowles et al. | |
| 4,360,135 A | 11/1982 | Goble | |
| 4,392,572 A | 7/1983 | Bernard | |
| 4,403,716 A | 9/1983 | Carlson et al. | |
| 4,413,761 A | 11/1983 | Angel | |
| 4,437,597 A | 3/1984 | Doyle | |
| 4,524,893 A | 6/1985 | Cole | |
| 4,607,858 A * | 8/1986 | Wagner | 280/491.5 |
| 4,702,401 A | 10/1987 | Graber et al. | |
| 4,815,638 A | 3/1989 | Hutyra | |

(Continued)

FOREIGN PATENT DOCUMENTS

SE    104714 C1    6/1942

*Primary Examiner*—Justin M Larson
(74) *Attorney, Agent, or Firm*—Young Basile

(57) ABSTRACT

A quick connection and release assembly for releasably mounting a bicycle rack on the bumper of a motor vehicle. The assembly includes a bumper plate structure adapted to be fixedly secured to the bumper by fasteners and defining at least one tongue extending upwardly from an upper edge thereof and a bicycle rack plate structure adapted to be fixedly secured to a rear face of the bike rack base plate by fasteners and including an aperture proximate an upper edge thereof sized to receive the tongue and retractable pins proximate lower side edges thereof for positioning behind a lower edge portion of the bumper plate structure.

13 Claims, 4 Drawing Sheets

U.S. PATENT DOCUMENTS

| | | | |
|---|---|---|---|
| 4,823,997 A | 4/1989 | Krieger | |
| 4,875,608 A | 10/1989 | Graber | |
| 5,022,649 A * | 6/1991 | Traub et al. | 473/488 |
| 5,029,740 A | 7/1991 | Cox | |
| 5,094,469 A | 3/1992 | Yamamoto et al. | |
| 5,154,462 A | 10/1992 | Carpenter | |
| 5,169,042 A | 12/1992 | Ching | |
| 5,236,342 A * | 8/1993 | Pellettier | 224/533 |
| 5,238,125 A | 8/1993 | Smith | |
| 5,246,120 A | 9/1993 | Walker | |
| 5,269,446 A | 12/1993 | Biehn | |
| 5,360,151 A | 11/1994 | Fine | |
| 5,522,530 A * | 6/1996 | Boettcher | 224/488 |
| 5,549,231 A | 8/1996 | Fletcher et al. | |
| 5,579,973 A | 12/1996 | Taft | |
| 5,685,469 A | 11/1997 | Stapleton | |
| 5,690,259 A | 11/1997 | Montani | |
| 5,692,659 A * | 12/1997 | Reeves | 224/536 |
| 5,755,454 A * | 5/1998 | Peterson | 280/491.1 |
| 5,775,560 A | 7/1998 | Zahn et al. | |
| 5,794,828 A | 8/1998 | Colan et al. | |
| 5,833,074 A | 11/1998 | Phillips | |
| 5,836,493 A * | 11/1998 | Grunsted et al. | 224/519 |
| 5,941,397 A | 8/1999 | Buchanan et al. | |
| 5,944,198 A | 8/1999 | Ihalainen | |
| 5,950,973 A * | 9/1999 | Verma | 248/222.51 |
| 5,984,111 A | 11/1999 | Pennella | |
| 5,996,870 A | 12/1999 | Shaver | |
| 6,047,869 A | 4/2000 | Chiu | |
| 6,050,426 A * | 4/2000 | Leurdijk | 211/94.01 |
| 6,053,336 A | 4/2000 | Reeves | |
| 6,089,430 A | 7/2000 | Mehls | |
| 6,092,706 A | 7/2000 | Bogan | |
| 6,095,387 A | 8/2000 | Lipscomb | |
| 6,244,483 B1 | 6/2001 | McLemore et al. | |
| 6,398,275 B1 | 6/2002 | Hartel et al. | |
| 6,511,250 B2 * | 1/2003 | Lindsay | 403/230 |
| 6,709,036 B1 | 3/2004 | Evans | |
| 6,968,986 B1 | 11/2005 | Lloyd et al. | |
| 6,976,615 B2 | 12/2005 | Dean | |
| 7,410,082 B2 | 8/2008 | Stewart | |
| 2005/0056672 A1 | 3/2005 | Stewart | |
| 2009/0189381 A1* | 7/2009 | Kirtland | 280/769 |

\* cited by examiner

RELEASABLE MOUNTING OF BICYCLE RACK ON VEHICLE BUMPER

BACKGROUND OF THE INVENTION

This invention relates to a motor vehicle bicycle rack assembly intended for mounting on a vehicle bumper. In a typical installation, the rack is permanently attached to the bumper and is mounted for movement between a working forwardly extending position for carriage of one or more bicycles and an upwardly pivoted stowage position. Whereas this arrangement is generally satisfactory, the bicycle rack even when in the upwardly pivoted stowage position encumbers and complicates the operation of the associated vehicle such for example as a bus.

SUMMARY OF THE INVENTION

The invention relates to a bicycle rack having a base plate adapted to be fixedly secured to a vehicle bumper and a carrier structure defining a bicycle cradle and mounted on the base plate for pivotal movement between a forwardly extending operative position for receipt of a bicycle in the cradle and an upwardly extending stowage position.

According to the invention, a quick connection and release assembly is provided for the bicycle rack. The quick connection and release assembly includes a bumper plate structure adapted to be fixedly secured to the bumper by fasteners and defining at least one tongue extending upwardly from an upper edge thereof and a bicycle rack plate structure adapted to be fixedly secured to a rear face of the bike rack base plate by fasteners and including an aperture proximate an upper edge thereof sized to receive the tongue and retractable pins proximate lower side edges thereof for positioning behind a lower edge portion of the bumper plate structure.

According to a further feature of the invention, the bumper plate structure comprises a plurality of bumper plates adapted to be fixedly secured to the bumper in laterally spaced relation by fasteners and each defining a tongue extending upwardly from an upper ridge thereof, and the bicycle rack plate structure comprises a like plurality of bicycle rack plates adapted to be fixedly secured to the rear face of the bicycle rack base plate by fasteners and each including an aperture proximate an upper edge thereof sized to receive the tongue of a respective bumper plate and retractable pins proximate lower side edges thereof for positioning behind a lower side edge portion of a respective bumper plate. In a disclosed embodiment of the invention, there are two bumper plates and two bicycle rack plates.

According to a further feature of the invention, the bumper plate structure includes a bumper plate; the bumper plate includes a planar vertical main body portion; a lower edge portion of the bumper plate includes a lower ledge portion extending horizontally forwardly from the lower region of the main body portion and a lower lip portion extending vertically downwardly from a forward region of the ledge portion and coacting with the ledge portion to define a crotch area behind the lip portion and beneath the ledge portion for receipt of retractable pins of the bicycle rack plate structure.

According to a further feature of the invention, the bumper plate further includes an upper edge portion including an upper ledge portion extending horizontally forwardly from an upper region of the main body portion and an upper lip portion extending vertically upwardly from a forward region of the upper ledge portion and the tongue extends upwardly from an upper edge of the upper lip portion.

According to a further feature of the invention, the bike rack plate structure includes a bike rack plate; the bike rack plate includes a planar vertical main body portion and a pair of lugs extending rearwardly from opposite edges of a lower edge portion of the bike rack plate and each carrying a retractable pin.

According to a further feature of the invention, the bike rack plate further includes a lip extending horizontally forwardly from an upper edge portion of the bike rack plate and an aperture in the lip sized to receive a tongue of the bumper plate.

According to a further feature of the invention, the aperture opens upwardly in the lip and forwardly in an adjoining section of the main body portion.

The invention also provides a methodology for releasably mounting a bicycle rack on the bumper of a motor vehicle.

According to the invention methodology, a bumper plate structure is fixedly secured to the bumper; quick connect structure is provided on the bumper plate structure; a bicycle rack plate structure is fixedly secured to the bicycle rack base plate; and quick connect structure is provided on the bicycle rack plate structure coacting with the quick connect structure on the bumper plate structure to releasably mount the bicycle rack on the bumper.

According to a further feature of the invention methodology, the quick connect structure on the bumper plate structure includes a tongue and the quick connect structure on the bicycle rack plate structure includes an aperture sized to receive the tongue.

According to a further feature of the invention methodology, the quick connect structure on the bicycle rack further includes retractable pins adapted to be positioned behind the bumper plate structure with the tongue received in the aperture.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
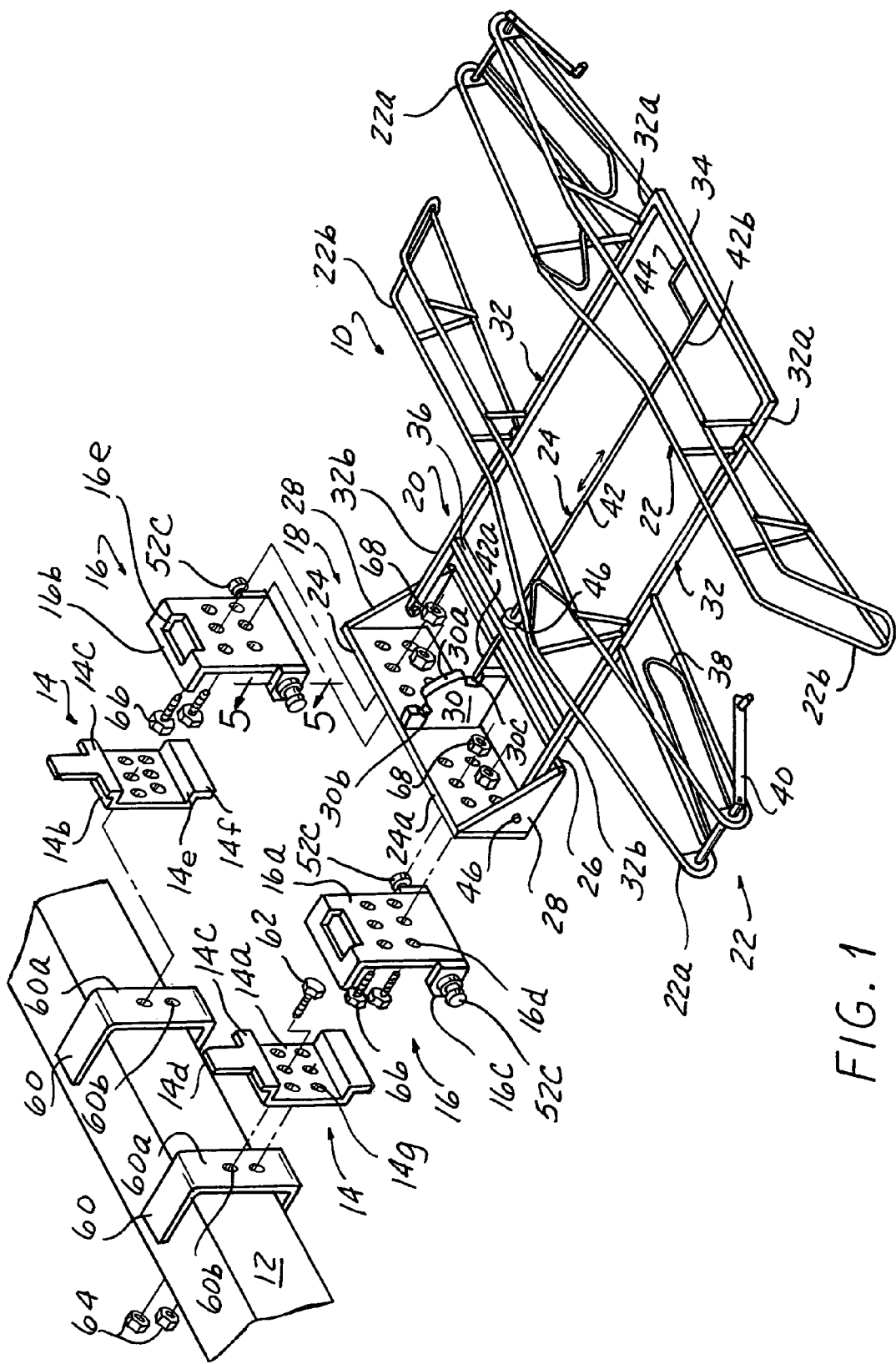
FIG. 1 is an exploded perspective view of a bicycle rack according to the invention including bumper plates and bicycle rack plates.
Figure 2:
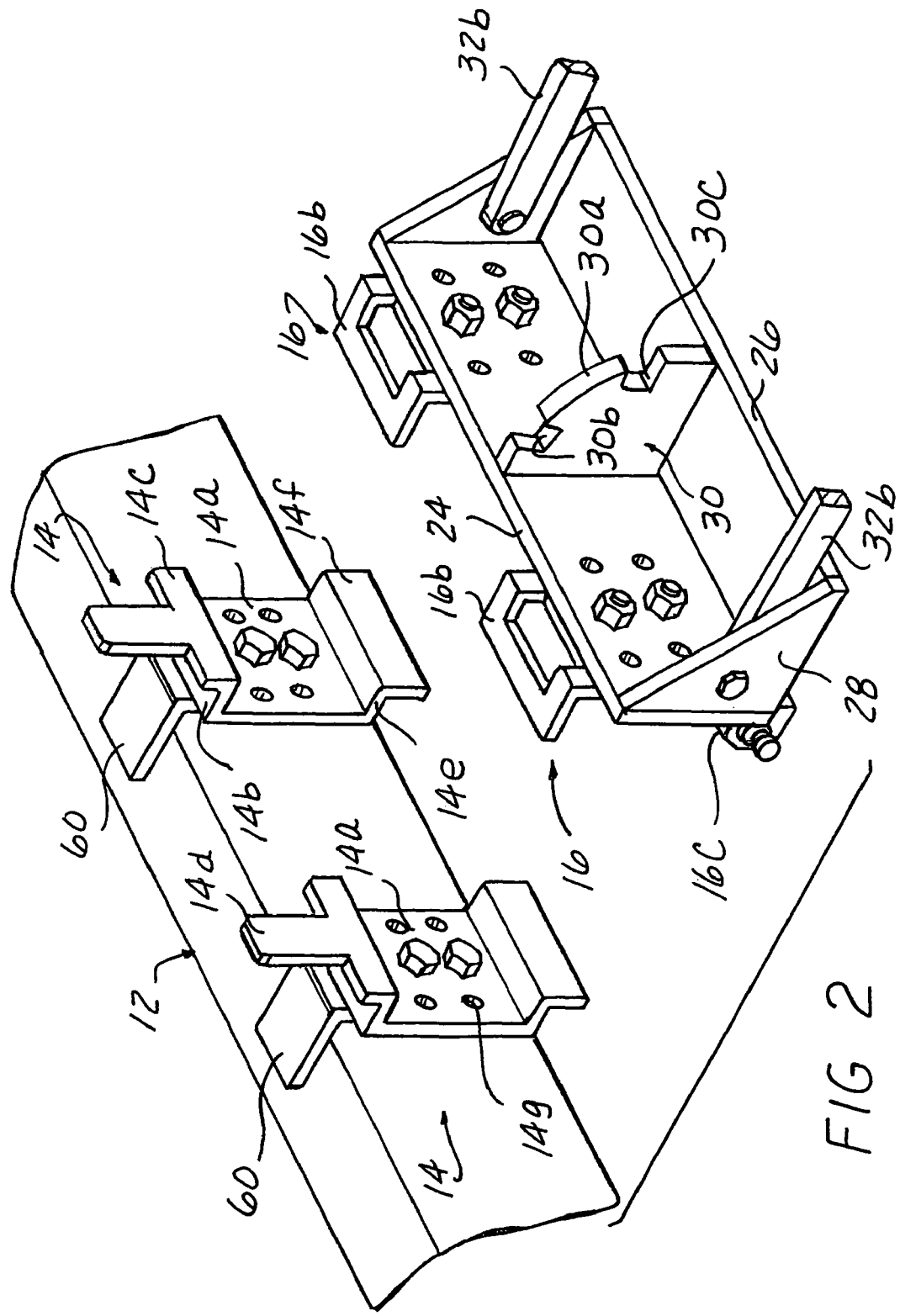
FIG. 2 is a perspective exploded view showing the bumper plates attached to the bumper and the bicycle rack plates attached to the bicycle rack.
Figure 3:
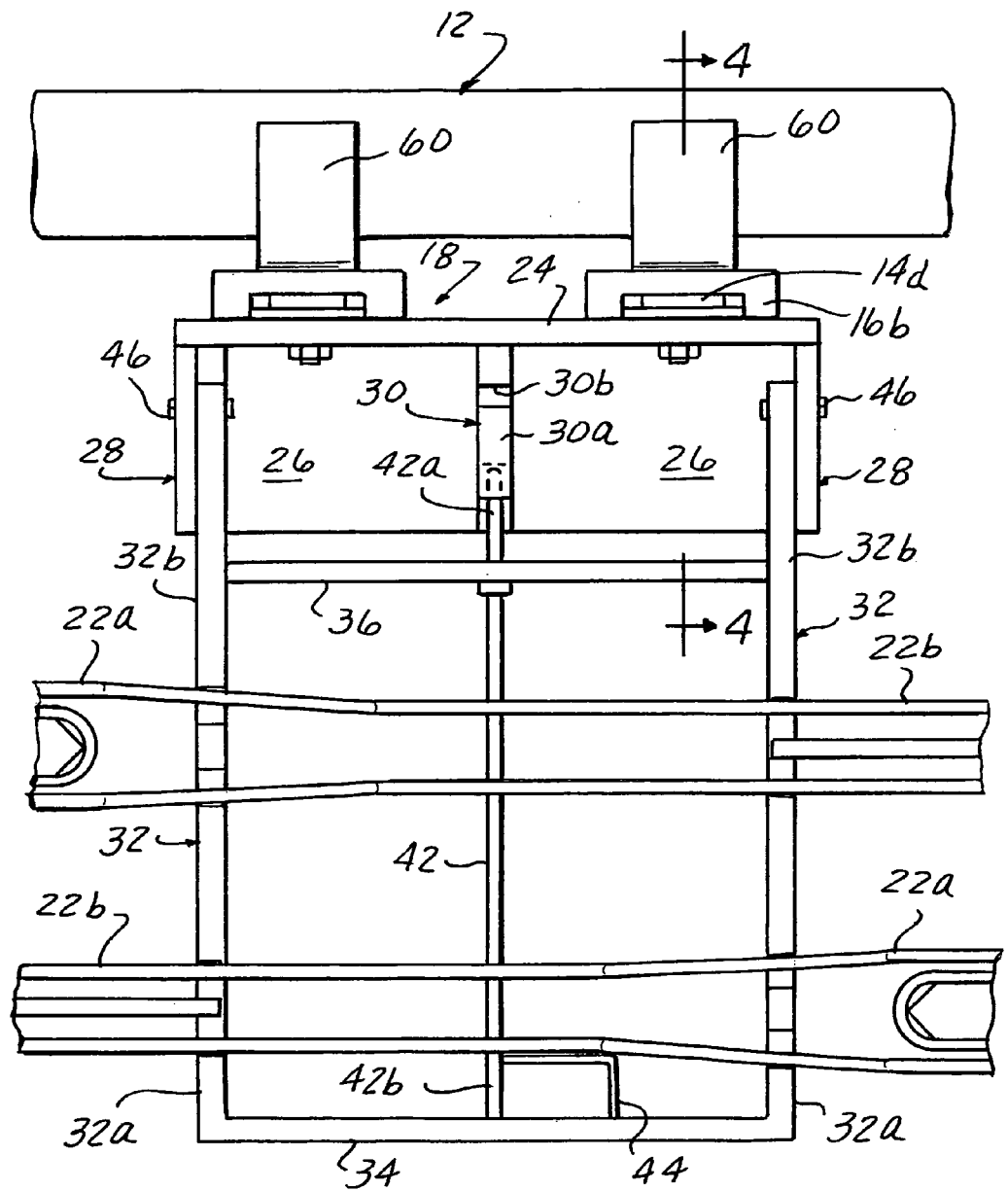
FIG. 3 is a plan view of the rack.

The quick connect and release assembly of the invention is intended for use in releasably attaching a bicycle rack 10 to a vehicle bumper 12 and, broadly considered, includes a pair of bumper plates 14 and a pair of bicycle rack plate structures 16.

Bike rack 10 includes a base plate structure 18 and a carrier structure including a frame 20, a pair of cradles 22, and a latch mechanism 24.

Base plate structure 18 includes a vertical base plate 24, a horizontal plate 26 forming a right angle with the vertical base plate, triangular end plates 28 interconnecting the end edges of the plates 24 and 26, and an arcuate latch plate 30 positioned centrally between end plates 28.

Latch plate 30 is fixedly secured to base plate 24 and base plate 26 and defines an arcuate cam surface 30a including a pair of spaced notches 30b and 30c.

Frame 20 includes a pair of parallel arm members 32, a cross-member 34 interconnecting outboard ends 32a of the arm members, and a further cross-member 36 extending between the arm members proximate inboard ends 32b of the arm members.

Each cradle 22 accommodates a single bicycle and includes a relatively short front well 22a sized to receive the front wheel of a bicycle and a relatively long rear well 22b sized to receive the rear wheel of the bicycle. The front and rear cradles 22 are preferably reversed 22 so that the short front wheel well of the front cradle confronts the long rear wheel well of the rear cradle and the long rear wheel well of the front cradle confronts the short front wheel well of the rear cradle.

A pivotal U-shaped lock arm 38 is associated with each cradle. Following placement of a bicycle in a cradle 22, the respective lock arm 38 is pivoted upwardly into grasping engagement with respect to the front wheel of the bicycle. A crank arm 40 may be associated with each lock arm 38 to facilitate the pivotal movement of the lock arm and an airspring (not shown) may be associated with each lock arm to serve to maintain the lock arm in tight engaging relationship with the bicycle wheel to preclude displacement of the bicycle from the respective cradle.

Figure 4:
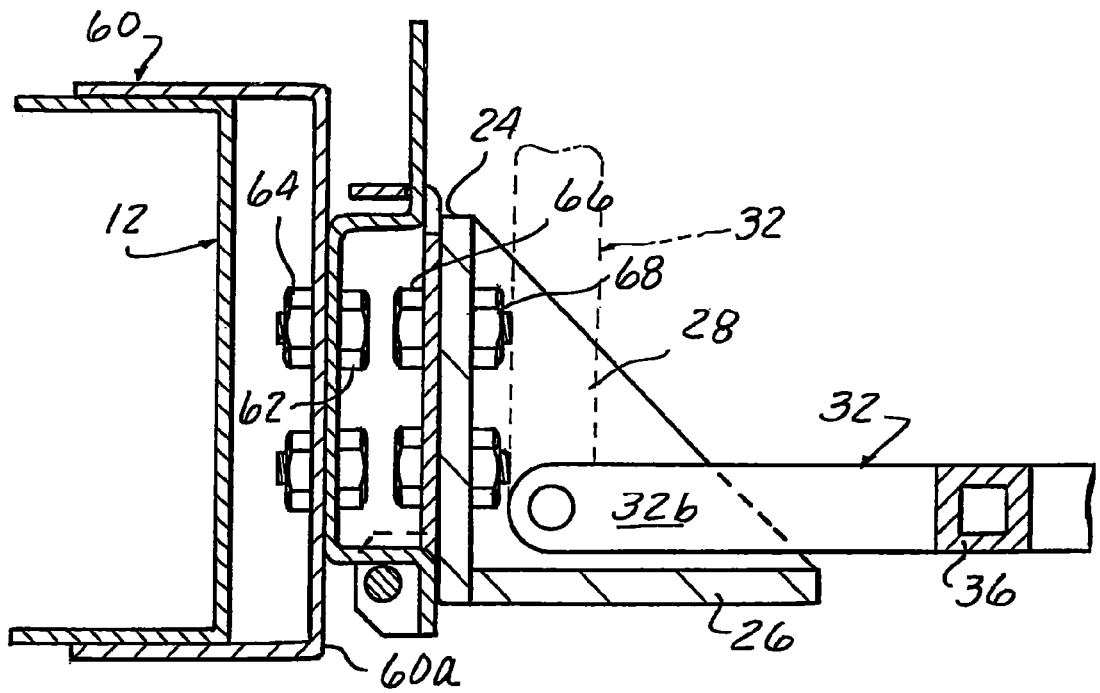
FIG. 4 is a fragmentary cross-sectional view taken on line 4-4 of FIG. 3.
Figure 5:
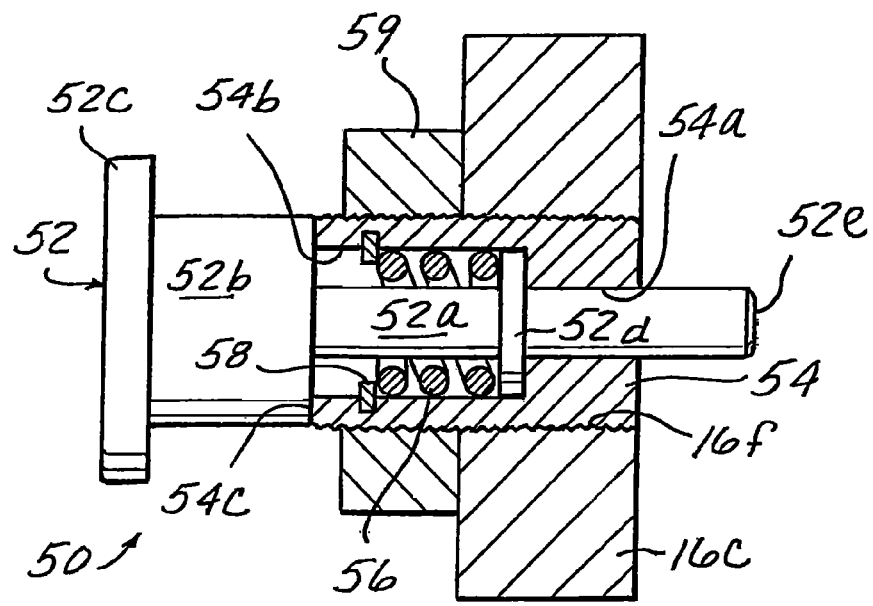
FIG. 5 is a fragmentary cross-sectional view taken on line 5-5 of FIG. 1.

Latch mechanism 24 includes a latch rod 42 and a latch handle 44. The inboard end 42a of the latch rod extends slidably through a bushing 46 in cross member 36 and the outboard end 42b of the rod is slidably received in cross member 34. In assembled relation, the inboard ends 32b of arm members 32 are pivotally secured to respective end plates 28 utilizing pivot pins 46 and the inboard end 42a of latch rod 42 coacts with cam surface 30a and notches 30b and 30c. Specifically, with the carrier extending forwardly from the base plate structure in a working bicycle carrying position, the rod end 42 is received in notch 30c and with the carrier pivoted upwardly to its stowage position, as indicated by the dash lines in FIG. 4, the rod end 42a is received in notch 30b. To move the carrier between its operative and stowage positions, the handle 44 is squeezed and the rod is moved outwardly to release the rod end 42a from the respective notch whereafter the carrier is moved to the opposite position with the rod end 42a guiding on the cam surface 30a until the latch rod reaches the other notch. A spring (not shown) biases the end 42a of the latch rod against the cam surface 30a, moves the rod end positively into the respective notch, and yieldably resists the releasing squeezing movement of the rod utilizing the handle 44.

Each bumper plate 14 includes a planar vertical main body portion 14a, an upper ledge portion 14b extending horizontally forwardly from an upper region of the main body portion, an upper lip portion 14c extending vertically upwardly from a forward edge of the ledge portion, a tongue portion 14d extending centrally upwardly from an upper edge of the lip portion 14c, a lower ledge portion 14e extending horizontally forwardly from a lower region of the main body portion, a lower lip portion 14f extending vertically downwardly from a forward edge of ledge ledge portion 14e, and a plurality of fastener apertures 14g provided in main body portion 14a.

Each bike rack plate 16 includes a planar vertical main body portion 16a, an upper lip portion 16b extending horizontally rearwardly from an upper edge of the main body portion, a pair of lugs 16c extending forwardly from opposite edges of a lower edge portion of the main body portion 16a, a plurality of fastener apertures 16d in main body portion 16a, a quick release aperture 16e in lip 16b and in the adjoining upper region of main body portion 16a, and a retractable pin structure 50 associated with each lug 16c.

Each pin structure includes a pin 52, a threaded socket member 54, a coil spring 56, and a lock nut 59.

Pin 52 includes a shank portion 52a, a head portion 52b terminating in a knob 52c, and an annular rib 52d formed on shank portion 52a.

In assembled relation, socket member 54 is threadably received in a threaded bore 16f in a respective lug 16c; shank portion 52a of pin 52 passes slidably through a central aperture 54a in socket member 54; spring 56 is positioned in a cavity 54b in the outboard end of the socket member between annular rib 52d and a "C" clip 58 suitably secured in bore 54c; and head portion 52b is positioned against the outboard annular edge 54c of the socket member.

The parameters of the assembly are such that the free end 52e of the shank portion normally extends inboard of the inboard face of the respective lug 16c under the urging of the spring 56 but can be readily withdrawn to a position flush with the inboard face of the respective lug utilizing the knob 52c.

The bike rack is secured to the bumper 12 utilizing a bracket structure suitably secured to the bumper. The bracket structure may comprise a single plate fixedly positioned forwardly of the bumper or may, as shown, comprise a pair of brackets 60 fixedly secured to the bumper at laterally spaced locations and each including a vertical attachment portion 60a spaced forwardly from the front face of the bumper and defining fastener apertures 60b.

Bumper plates 14 are fixedly and permanently secured to the front face of a respective bracket 60 utilizing bolts 62 passing through apertures 14g and 60b for engagement with nuts 64. The lateral adjustment of the respective bumper plate relative to the respective bracket 60 may be varied depending upon the selection of the particular fastener apertures 14g in the main body portion 14a of the bumper plates.

Bike rack plates 16 are fixedly secured to a rear face of the vertical base plate 24 of the base plate structure 18 utilizing bolts 66 passing through apertures 16d in the main body portion 16a of the plates and through suitable fastener apertures 24a in the base plate for engagement with nuts 68. The lateral position of the base plate structure relative to the bike rack plates may be selectively varied by selective use of the various fastener apertures 24a.

To attach the bike rack to the bumper plates, pins 52a are moved to an outboard position, the bike rack plate apertures 16e are positioned over the tongues 14d with the rack angled upwardly relative to the bumper plates and the lips 16b engaging the lips 14c, the bike rack plates are pivoted downwardly to position the main body portion 16a of the bike rack plates against the lips 14c and 14f of the bumper plates and position the pins 52 in a crotch area defined at the intersection of ledge portions 14e and lip portions 14f, and the pins are released to allow the free ends 52e of the pins to move under the urging of springs 56 into the crotch area whereby to position the pins beneath the ledge 14e and behind the lips 14f and firmly and positively mount the bike rack on the bumper. Note that each mounting aperture 16e opens upwardly in the respective lip portion 16b and also opens forwardly in an upper region of the main body portion 16a of the plate. This over sizing of the attachment apertures relative to the tongues 14d facilitates the insertion of the tongues into the apertures and specifically allows the bike rack plates to be positioned over the tongues 14d in an upwardly angled position whereafter the bike rack may be pivoted downwardly to its mounted position on the bumper plates.

Removal of the bike rack from the bumper plates is accomplished by a reverse procedure wherein the pins 50 are withdrawn and the bike rack structure is pivoted upwardly and then lifted upwardly off of the tongues 14d.

It will be seen that the invention quick release mechanism and methodology allows the bicycle rack to be readily removed from the associated vehicle such as a bus leaving only the relatively unobtrusive bumper plate attached to the bumper of the bus.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. For use with a bicycle rack having a base plate adapted to be secured to a vehicle bumper and a carrier structure defining a bicycle cradle and mounted on the base plate for pivotal movement between a forwardly extending operative position for receipt of a bicycle in the cradle and an upwardly extending stowage position, a quick connection and release assembly comprising:
    a bumper plate structure adapted to be fixedly secured to the bumper by fasteners and defining at least one tongue extending upwardly from an upper edge thereof; and
    a bicycle rack plate structure adapted to be fixedly secured to a rear face of the bike rack base plate by fasteners and including an aperture proximate an upper edge thereof sized to receive the tongue and retractable pins proximate lower side edges thereof; wherein:
    the bumper plate structure includes a bumper plate; and
    the bumper plate includes a planar vertical main body portion, a lower ledge portion extending horizontally forwardly from a lower region of the main body portion, and a lower lip portion extending vertically downwardly from a forward region of the ledge portion and coacting with the ledge portion to define a crotch area behind the lip portion and beneath the ledge portion for receipt of retractable pins of the bicycle rack plate structure.

2. A quick connection and release assembly according to claim 1 wherein:
    the bumper plate further includes an upper edge portion;
    the upper edge portion includes an upper ledge portion extending horizontally forwardly from an upper region of the main body portion and an upper lip portion extending vertically upwardly from a forward edge of the ledge portion; and
    the tongue extends upwardly from an upper edge of the upper lip portion.

3. For use with a bicycle rack having a base plate adapted to be secured to a vehicle bumper and a carrier structure defining a bicycle cradle and mounted on the base plate for pivotal movement between a forwardly extending operative position for receipt of a bicycle in the cradle and an upwardly extending stowage position, a quick connection and release assembly comprising:
    a bumper plate structure adapted to be fixedly secured to the bumper by fasteners and defining at least one tongue extending upwardly from an upper edge thereof; and
    a bicycle rack plate structure adapted to be fixedly secured to a rear face of the bike rack base plate and comprising: a bicycle rack plate that includes a planar vertical main body portion, a pair of lugs extending rearwardly from opposite sides of a lower edge portion of the main body portion and each carrying a retractable pin, a lip extending horizontally from an upper edge portion of the main body portion, and an aperture in the lip sized to receive a tongue of the bumper plate; wherein the aperture opens upwardly in the lip and forwardly in an adjoining section of the main body portion; and wherein the retractable pins are configured for positioning behind a lower edge portion of the bumper plate structure and are movably affixed to the bicycle rack plate structure in use and non-use.

4. A quick connection and release assembly according to claim 3 wherein:
    the bumper plate structure comprises a plurality of bumper plates adapted to be fixedly secured to the bumper by fasteners in laterally spaced relation and each defining a tongue extending upwardly from an upper edge thereof; and
    the bicycle rack plate structure comprises a like plurality of bike rack plates adapted to be fixedly secured to the rear face of the bicycle rack base plate by fasteners and each including an aperture proximate an upper edge thereof sized to receive the tongue of a respective bumper plate and retractable pins proximate lower side edges thereof for positioning behind a lower side edge portion of a respective bumper plate.

5. A quick connection and release assembly according to claim 4 wherein there are two bumper plates and two bicycle rack plates.

6. An assembly for quick connection and release of a bicycle rack carrier onto a bumper of a vehicle, the assembly comprising:
    a bumper plate structure having a bumper plate structure upper portion and an opposing bumper plate structure lower portion, a vertical main body portion extending between the bumper plate structure upper and lower portions, a lower ledge portion extending horizontally forwardly from the bumper plate structure lower portion, and a lower lip portion extending vertically downwardly from the ledge portion, wherein the bumper plate structure is adapted to be fixedly secured to the bumper, and wherein the bumper plate structure has at least one tongue extending from the bumper plate structure upper portion;
    a bike rack base plate attachable to the bicycle rack carrier, the bike rack base plate having a rear face and an opposing front face;
    a bicycle rack plate structure having a bicycle rack plate structure upper portion and an opposing bicycle rack plate structure lower portion and adapted to be fixedly secured to the rear face of the bike rack base plate, the bicycle rack plate structure including an aperture proximate the bicycle rack plate structure upper portion, the aperture sized to receive the tongue, and at least one retractable pin that is received behind the lip portion and beneath the ledge portion in order to releasably secure the bicycle rack plate structure to the bumper plate structure.

7. The assembly of claim 6, wherein the at least one retractable pin is movably affixed to the bicycle rack plate structure lower portion.

8. The assembly of claim 6, wherein the retractable pin comprises:
   a pin having a shank member, a head portion terminating a first end of the shank member, a securing portion terminating a second end of the shank member, and an annular rib portion extending between the first and second ends of the shank member;
   a socket member encasing the annular rib portion and at least a portion of the shank member; and
   a spring member positioned in the socket member and configured to compress and decompress in response to movement of the annular rib portion.

9. The assembly of claim 6, wherein the bicycle rack plate structure includes at least one lug extending rearwardly from a side of the bumper plate structure lower portion, the lug carrying the at least one retractable pin.

10. A method of releasably attaching a bicycle rack having a bicycle rack base plate to a bumper using a bumper plate structure and a bicycle rack plate structure, wherein the bumper plate structure defines at least one tongue extending from an upper edge thereof, a lower ledge portion extending horizontally forwardly a lower edge thereof, and a lower lip portion extending vertically downwardly from the ledge, and wherein the bicycle rack plate structure includes at least one aperture proximate an upper edge thereof sized to receive the at least one tongue and at least one retractable pin proximate a lower edge thereof, comprising:
   fixedly securing the bumper plate structure to the bumper;
   fixedly securing the bicycle rack plate structure to the bicycle rack base plate;
   moving the at least one retractable pin to an outboard position;
   positioning the at least one aperture over the at least one tongue such that the bicycle rack plate structure is in a mounted position;
   moving the at least one retractable pin to an inboard position behind the lip portion and beneath the ledge portion of the bumper plate structure to releasably secure the bumper plate structure to bicycle rack plate structure.

11. The method of claim 10, wherein the at least one retractable pin is movably affixed to the bicycle rack plate structure.

12. The method of claim 10, wherein positioning the at least one aperture over the at least one tongue further comprises:
   tilting the bicycle rack plate structure upwardly;
   inserting the at least one tongue into the at least one aperture; and
   pivoting the bicycle rack plate structure downwardly to the mounted position.

13. The method of claim 10, further comprising:
   moving the at least one retractable pin to the outboard position to unsecure the bumper plate structure from bicycle rack plate structure.

* * * * *